Feb. 11, 1969  G. A. PETERSEN  3,426,860
PILOT BIT WITH REPLACEABLE TEETH
Filed Dec. 27, 1966  Sheet 1 of 3
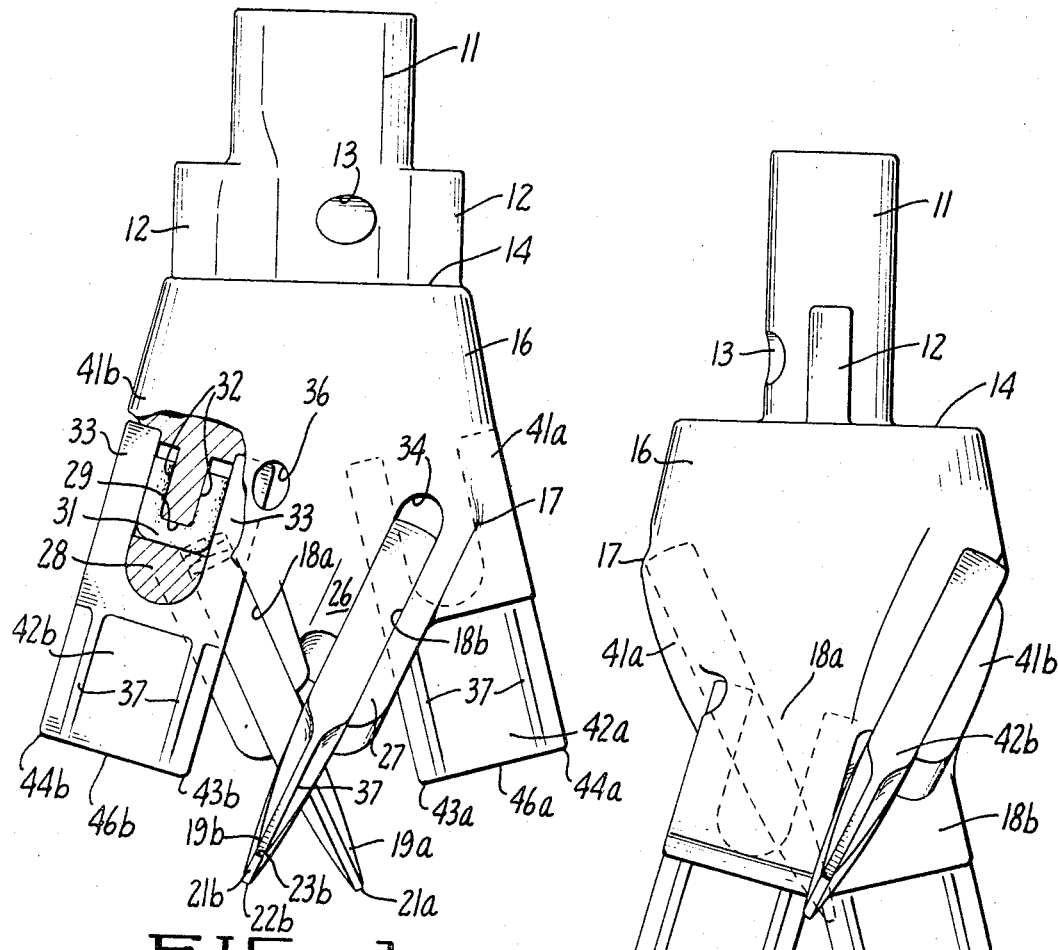
FIG. 1.
FIG. 2.
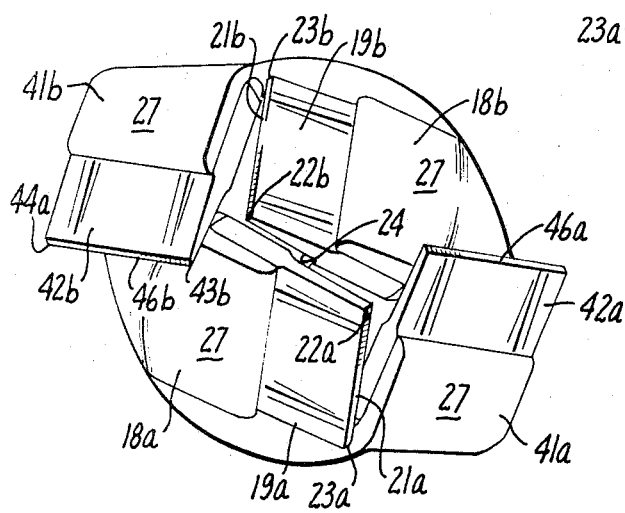
FIG. 3.
INVENTOR.
GERALD A. PETERSEN
BY
ATTORNEY INVENTOR.
GERALD A. PETERSEN
BY Julian Caplan
ATTORNEY

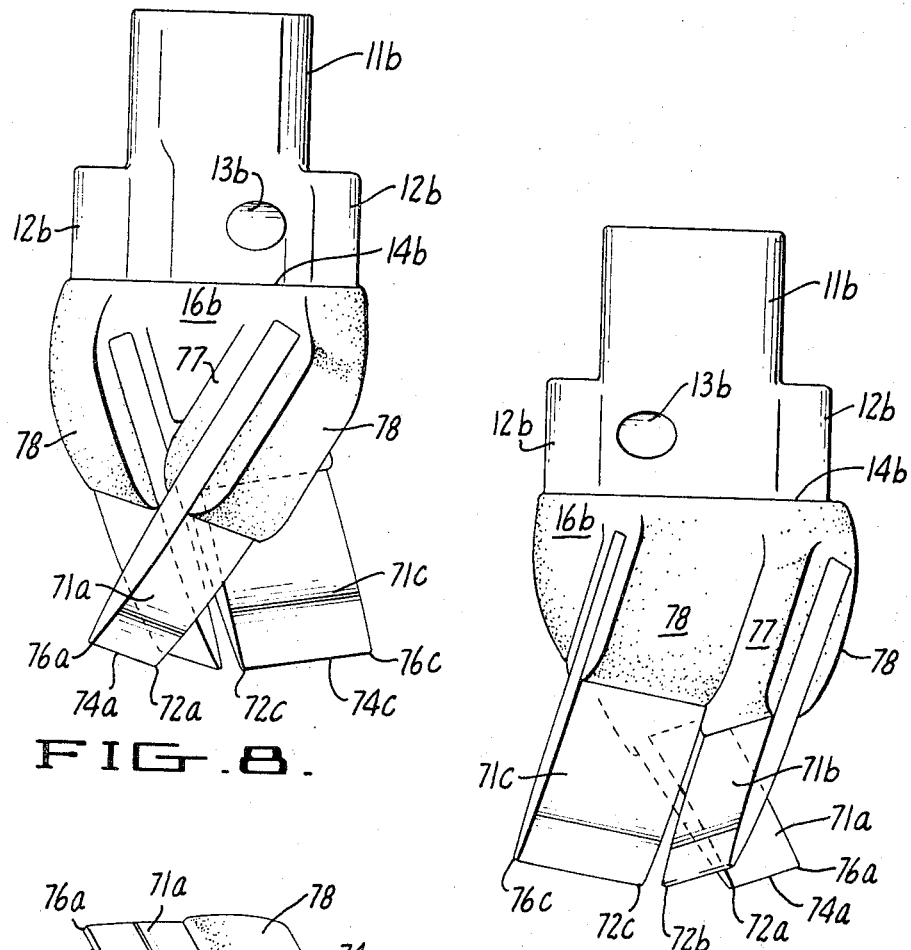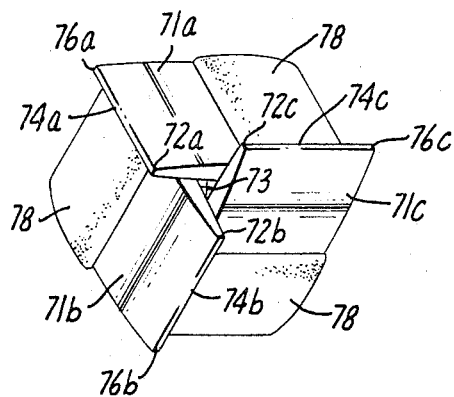

United States Patent Office 3,426,860
Patented Feb. 11, 1969

3,426,860
PILOT BIT WITH REPLACEABLE TEETH
Gerald A. Petersen, Cupertino, Calif. (Petersen Engineering Co. Inc., 950 Kifer Road, Sunnyvale, Calif. 94086)
Filed Dec. 27, 1966, Ser. No. 604,726
U.S. Cl. 175—392 11 Claims
Int. Cl. E21c *13/00*

ABSTRACT OF THE DISCLOSURE

A pilot bit has replaceable teeth, the lowermost teeth being directed to cut close to the axis of rotation of the bit, oher teeth being outward directed to insure that the hole dug is as large as the bit body. Teeth may have tungsten carbide tip inserts in a steel body, the inserts being side-by-side in a line and wearing to provide projecting fingers.

---

This invention relates to a new and improved pilot bit having removable teeth.

It is customary to use pilot bits such as that shown in U.S. Patent 2,773,673 on the lower ends of augers of the type used for digging holes for utility poles and the like. The pilot bit functions to more accurately locate the path of the auger and to keep it aligned in proper direction. The pilot bit has two or more cutting edges located at the bottom which absorb considerable wear. Heretofore when the cutting edges have been worn away, the pilot bit must be discarded. Accordingly, a principal purpose of this invention is to provide removable teeth which function as cutting edges. When the teeth are worn they may be sharpened or replaced without discarding the body of the pilot bit, a matter of considerable economy in that the material of construction of such bits is hard steel and hence is relatively expensive.

Another feature of the invention is the fact that it enables the pilot bit to be provided with more than two cutting edges, whereas previous pilot bits have had only a limited number of edges by reasons inherent in their construction. In the accompanying drawings four replaceable teeth are shown in one modification, providing four cutting edges, and in another modification three teeth are shown. Preferably three or more teeth may be used.

A further feature of the present invention is the fact that the use of multiple teeth makes it possible to position the teeth at various angles, thereby improving the cutting action.

Earth augers have employed replaceable teeth for many years. The present invention affords the opportunity to use the same teeth in the pilot bit as used in the auger.

When digging in very hard ground or rock, it is sometimes necessary to use tungsten carbide inserts in the pilot bit or auger teeth. The present invention provides means whereby tungsten carbide teeth may be interchanged with ordinary steel teeth when the operating conditions so require.

A still further feature of the invention is the provision of a tooth having round holes formed therein to receive tungsten carbide inserts brazed in the holes, the cutting edges of the tungsten carbide teeth being thin and straight. Hence, the inserts are readily held in the tooth but the inserts are positioned for a most effective cutting action. It will further be understood that as wear occurs, the relatively soft steel in which the inserts are embedded wears first, leaving a plurality of projecting fingers of tungsten carbide, which are particularly effective in cutting in difficult soil.

Other objects of the present invention will become apparent upon reading the following specification and referring to the accompanying drawings in which similar characters of reference represent corresponding parts in each of the several views.

In the drawings:

FIG. 1 is a side elevational view of a pilot bit in accordance with the present invention partly broken away to reveal a means for holding the teeth in the bit body.

FIG. 2 is a view similar to FIG. 1 rotated 90°.

FIG. 3 is a bottom plan.

FIG. 8 is a view similar to FIG. 1 of a modified pilot bit.

FIG. 9 is a view similar to FIG. 8 rotated 90°.

FIG. 10 is a bottom plan of the structure of FIGS. 7 and 8.

Figure 4:
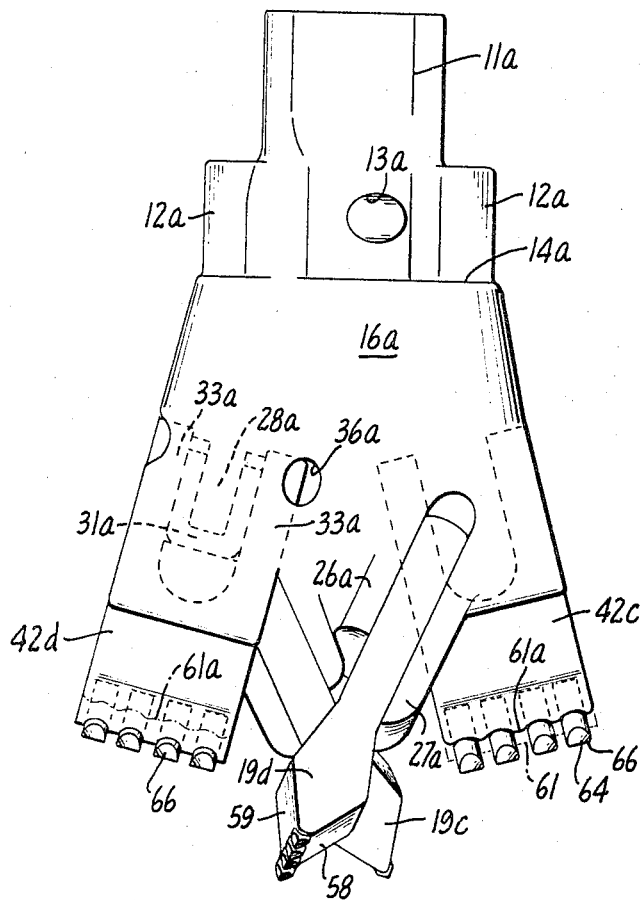
FIG. 4 is a view similar to FIG. 1 of a pilot bit showing use of a modified tooth.

The pilot bit which is the subject of the present invention is adapted for connection to the bottom of an auger head, auger shaft or adapter as is well understood in this art. For such purpose, there is provided in the upper end a non-circular stem 11 having a pair of laterally projecting lugs 12 and further provided with a transverse hole 13 for a bolt (not shown) to hold the bit in place. The noncircular shape heretofore described and shown in the drawings fits in a complementary socket and the rotation of the auger stem causes the pilot bit to turn without imposing a shearing stress upon the bolt which is inserted through hole 13.

A shoulder 14 is formed at the bottom of stem 11 to limit movement of the bit relative to the socket in which it is inserted.

The working portion of the bit has a generally conical downwardly-outwardly sloping upper body 16 and below the level 17 of maximum width, the body slopes downwardly-inwardly. The bit body is formed adjacent its lower end with a pair of lower tooth receiving sockets 18a, 18b, each receiving a lower tooth 19a, 19b having a transverse lower cutting edge 21a, 21b, respectively, extending across the width of the tooth. The sockets 18a, 18b are so positioned that their respective teeth slant downwardly and slightly outwardly and are further directed so that the inner corner 22a of tooth 19a is lower than the outer corner 23a and similarly the inner corner 22b of tooth 19b is lower than the outer corner 23b thereof. Thus, the cutting edges 21a and 21b are askew relative to each other and are disposed on opposite sides of the central axis 24 of the bit. This arrangement insures that the back corner of the tooth does not strike an uncut portion of the hole being dug by the pilot bit. The positioning of the teeth insures that the lowermost portions of the teeth engaging the ground are closest to the central axis 24 which also insures a more positive and properly aligned cutting action.

The sockets for the teeth are formed by a pair of spaced flanges 26, 27 parallel to the flat top and bottom surfaces of the proximal portion of each tooth, the flanges 26, 27 being interconnected by a web 28 formed with a transverse hole 29 which receives a resilient insert 31. Grooves 32 are formed on each side of the web 28 rearward of hole 29. The proximal portion of the tooth is formed with a pair of prongs 33 approximately rectangular in cross-section and engaging the sides of web 28. The resilient insert 31 is bent back by the prongs 33 into the grooves 32 and the insert is compressed between the bottom of the groove and the side of the prong so that it is deformed and resiliently restrains unintentional withdrawal of the tooth from its socket. In order to remove the tooth a tool may be inserted through the opening 34 in the socket at the back of the tooth or through a hole 36 which communicates with the back end of the tooth.

The distal portion of the tooth tapers forwardly in relatively broad top and bottom surfaces which are reinforced by ribs 37 spaced inwardly from the side edges of the tooth. As has been mentioned, the front end of the tooth has a blunt transverse cutting edge 21. Other tooth shapes and other means for holding the teeth in their sockets may be employed.

The foregoing described tooth is similar to that shown in U.S. patent application Ser. No. 317,541, filed Oct. 21, 1963. The means for holding the tooth against the holder and the holder construction is similar to that shown in U.S. Patent No. 2,968,880.

The sockets which have been heretofore described are relatively deep and angularly disposed. Hence the upper ends of the sockets are wider than the hole cut by the lower teeth. Acordingly, in order to widen out the hole to provide clearance for the tooth holding sockets, additional teeth are employed slanted downwardly-outwardly to provide clearance.

Displaced approximately 90° when viewed in plan from sockets 18a, 18b, are socket-forming structures 41a, 41b holding teeth 42a, 42b, respectively. The sockets 41a, 41b are displaced approximately 180° from each other and are directed so that the teeth 42a, 42b slant downwardly-outwardly relative to the axis of rotation of the bit and also slant downwardly-forwardly relative to the direction of rotation. Further, the inner corners 43a, 43b are lower than the correponding outer corners 44a, 44b, respectively. This results in the cutting edges 46a and 46b slanting upwardly-outwardly and slightly rearwardly relative to the direction of rotation of the bit.

The teeth 42a, 42b may be similar to the teeth 19a, 19b, or they may be of different construction. The means whereby the teeth are held in their respective sockets may be similar to the means holding teeth 19a, 19b in place.

In the modification shown in FIGS. 1 to 3, inclusive, a pilot bit having four replaceable teeth is shown, although the number of teeth is subject to considerable modification. The two lowermost teeth 19a, 19b are so positioned in the initial condition thereof that the inner bottom corners 22a, 22b initiate the digging action and the cutting edges 21a, 21b broaden the cut so that the bottommost teeth produce a hole having the diameter of the spacing between the outer corners 23a, 23b. To provide clearance for the sockets holding the lowermost teeth in position and also to widen the hole dug by the pilot bit to accommodate the auger head hub, the additional teeth 42a, 42b are directed outwardly and their outer corners 44a, 44b dig a hole having a diameter greater than any portion of the pilot bit and of sufficient size to accommodate the hub. The cutting edges 21a, 21b, 46a, 46b absorb the wear of the bit with use. When required, the teeth may be removed, sharpened and/or reversed in direction to achieve maximum use from the teeth. However, when the teeth are completely worn they are replaced with other teeth by knocking the worn teeth out of their sockets through spaces 34 or holes 36, the same teeth being used as replacements as are used in the auger, or if desired different style teeth may be used. Replacement of the hardened teeth protects the body 16 of the bit from wear and enables the body 16 to be made of a tougher but less hard material than the teeth to absorb the strain of digging. Further the structure of the body 16 is preserved and need not be discarded when the cutting edges are depleted.

Figure 6:
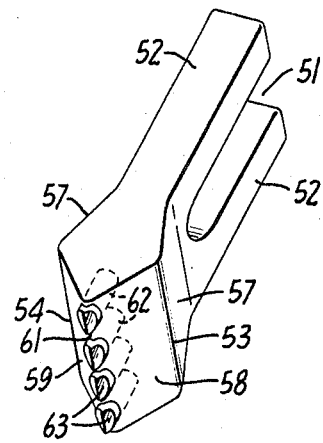
FIG. 6 is a perspective view showing the modified tooth construction.
Figure 5:
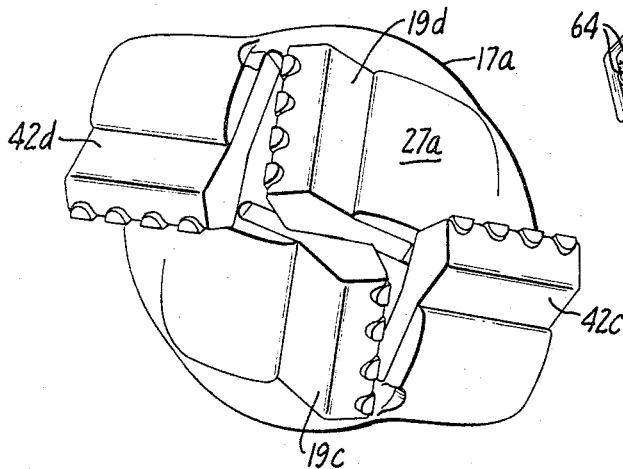
FIG. 5 is a bottom plan of the structure of FIG. 4.

In the modification of the invention shown in FIGS. 4–6 inclusive, the pilot bit body including the socket forming means for the teeth is essentially the same as in the preceding modification and the same reference numerals are employed to designate corresponding parts. The tooth is of modified construction, particularly in the distal portion thereof. Referring first to the proximal portion of the tooth, there is provided a longitudinal forwardly extending slot 51 which divides the proximal end into two prongs 52, each substantially rectangular in cross-section and designed to accommodate the space between the flanges 26, 27, with the slot 51 dimensioned to receive the web 28. The tooth is held in place by a resilient retainer 31 in the same manner as in the preceding modification.

The proximal portion of the tooth provides a thickened top and bottom hump 53, 54 which is of a thickness greater than that between the flanges 26, 27 to protect the latter from abrasion. Thus the top and bottom surfaces 56, 57 of the distal portion slant outwardly to achieve the hump 53, 54 and the outer top and bottom surfaces 58, 59 converge forwardly to a substantially transverse front edge 61. Formed in the front edge 61 and extending longitudinally rearwardly are holes 62, here shown to be cylindrical in shape and four in number, it being understood that these details are subject to variation. Each hole 62 receives a cutting tip 63 preferable formed of an extremely hard substance such as tungsten carbide. The tips 63 have cylindrical proximal ends which fit into the holes 62 and are held in place by brazing, by drive fit or by other suitable means with the distal ends protruding beyond the front edge 61. The distal end has top and bottom flat surfaces 64, 64 which converge forwardly to provide a front transverse cutting edge 66.

Figure 7:
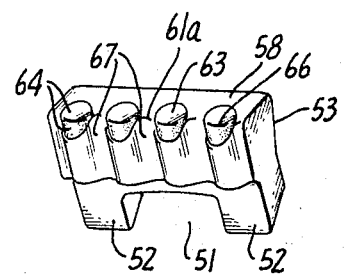
FIG. 7 is a perspective view of a worn tooth showing the wear pattern of the bottom.

The initial condition of the tooth is best shown in FIG. 6. The body of the tooth is formed of a relatively soft material and hence as is shown in FIGS. 4 and 7, the body of the tooth wears whereas the hard inserts 63 do not wear rapidly. Accordingly, with the passage of time the forward edge 61 recedes to a typical line such as that shown by reference numeral 61a in FIG. 4, leaving a plurality of forward extending fingers comprising the distal portions of the inserts 63. Further, the bottom of the tooth wears faster between the carbide inserts, resulting in grooves 67 between the fingers, which produces a continual sharp, longer wearing tooth. The provision of the forward-extending fingers improves the cutting action of the tooth by providing a plurality of cutting edges and since these cutting edges are of an extremely hard substance the tooth of the modifications of FIGS. 4–7 will cut through extremely hard substances.

In the accompanying drawings, the teeth corresponding to the teeth 19a, 19b, 42a, 42b have been designated with reference numerals 19c, 19d, 42c and 42d, respectively. Other elements of the modification of FIGS. 4–7 resemble those of FIGS. 1–3 and the same reference numerals followed by subscript a are used to designate corresponding parts.

The teeth of FIGS. 1 and 4 are interchangeable in that the sockets holding them are identical. Accordingly, by interchanging the teeth the teeth of FIG. 4 may be used for digging through extremely hard soil and the teeth of FIG. 1 will dig through relatively soft soil. On the other hand the pilot bits themselves may be interchanged, one pilot bit being provided with the hard soil teeth and the other with the soft soil teeth.

In the modifications of FIGS. 1 and 4, four teeth are removably installed in the pilot bit. In FIGS. 8–10, the invention is shown using three teeth 71a, b, c. The teeth themselves are shown of the type of Pat. 2,968,880 and the means for retaining them in their sockets are likewise the same as in said patent, although subject to variation. It will be seen from bottom plan view FIG. 9 that the inner corners of 72a, b, c of the three teeth are equiangularly spaced relative to the axis of rotation 73 of the bit. Corners 72 are the lowermost and innermost portions of each tooth and the cutting edges 74 viewed in plan as in FIG. 9 slant outwardly-backwardly with respect to the direction of rotation. At the same time edges 74 slant outwardly upwardly when viewed in elevation. Hence the outer corners 76a, b, c are farthest from axis 73 than any other point either on the teeth or on the body of the bit. Accordingly, the teeth provide clearance for the bit body and there is no "heeling" since the cutting edges extend farther from the axis than the tooth sockets defined by flanges 77, 78 for each tooth. As is inherent from the foregoing, the tooth sockets are disposed in the body so that the teeth slant to accomplish the tooth configuration described. In other respects the elements of this modification resemble those of FIGS. 1–3 and the same reference numerals followed by subscript b are used to designate corresponding parts.

Although the foregoing invention has been described in some detail, by way of illustration and example for purposes of clarity of understanding, it is understood that certain changes and modifications may be practiced within the spirit of the invention and scope of the appended claims.

What is claimed is:

1. A pilot bit comprising a body, said body formed with a plurality of tooth-holding sockets, a plurality of removable teeth each received in a socket, and retainers holding said teeth in said sockets against unintentional withdrawal, said teeth slanting downward and only slightly forward in the direction of rotation of said body and having a transverse cutting edge, the inner corner of said cutting edge being lower than the outer corner and said inner corner being advanced relative to said outer corner in the direction of rotation of said body, said tooth being lowermost and positioned to cut close to the axis of rotation of said body.

2. A bit according to claim 1, in which each said retainer comprises a resilient member squeezed between a wall of a socket and the adjacent tooth and frictionally engaging said tooth.

3. A bit according to claim 1, which further comprises at least one outer tooth slanted downward-outward and having its outer corner farther from the axis of said bit than any other portion of said body or of either of said teeth.

4. A bit according to claim 3, in which there are four said sockets and four teeth in said sockets, said sockets positioned to hold two diametrically opposed said teeth slanting downwardly and slightly outwardly with the inner corners of the bottom edges of said teeth lower than the outer corners and to hold two other said teeth disposed approximately 90° relative to the axis of said bit from the first mentioned two teeth with said other two teeth slanting downwardly-forwardly and downwardly-outwardly, the outer corners of said last mentioned two teeth being farther from the axis of said bit than any other portion of said bit.

5. A bit according to claim 3, in which there are three said sockets and three teeth in said sockets, said teeth equi-angularly spaced with the inner corners of the bottom edges of said teeth are lowermost and innermost and the bottom edges slant outwardly-backwardly in plan and outwardly-upwardly in elevation, the outer corners of said bottom edges farther from the axis of rotation of said bit than any other portion of said bit.

6. A pilot bit comprising a body, said body formed with a plurality of tooth-holding sockets, a plurality of removable teeth each received in a socket, and retainers holding said teeth in said sockets against unintentional withdrawal, each said tooth having a distal portion and a proximal portion, the distal portion of at least one said tooth having forward converging top and bottom surfaces and a transverse front edge, said front edge being formed with a plurality of rearward extending holes and which further comprises a plurality of cutting tips formed of a hard material and having an inner end shaped to fit in one said hole and a sharpened front end protruding beyond the front edge of said distal portion, and means holding said tips in said holes.

7. A bit according to claim 6, in which said front end has converging top and bottom faces and a transverse cutting edge.

8. A bit according to claim 6, in which said tips are substantially harder than the other portions of said tooth.

9. A tooth comprising a proximal portion and a distal portion having forward converging top and bottom surfaces and a transverse front edge, said distal portion formed of steel, said front edge formed with at least three rearward extending holes and which further comprises a plurality of cutting tips formed of a hard tungsten carbide-type material and having an inner end shaped to fit in one said hole and a sharpened front end protruding beyond the front edge of said distal portion, and means holding said tips in said holes, each said tip projecting forwardly beyond the forward edge of said distal portion side-by-side across the forward edge of the tooth.

10. A tooth according to claim 9, in which said proximal portion is formed with said longitudinal slot dividing said proximal portion into a pair of prongs each substantially rectangular in cross-section.

11. A tooth according to claim 9, in which said front end has converging top and bottom faces and a transverse cutting edge.

References Cited

UNITED STATES PATENTS

| 2,010,510 | 8/1935 | Cook | 175—392 |
|---|---|---|---|
| 2,554,820 | 5/1951 | Evans | 175—392 |
| 2,756,025 | 7/1956 | Lay | 175—392 X |
| 3,057,091 | 10/1962 | Petersen | 175—413 X |
| 3,136,077 | 6/1964 | Troeppl | 175—413 X |
| 3,235,018 | 2/1966 | Troeppl | 175—391 |
| 3,294,186 | 12/1966 | Buell | 175—410 |
| 3,342,532 | 9/1967 | Krekeler | 175—410 X |

NILE C. BYERS, JR., *Primary Examiner.*